(12) United States Patent
Egawa (10) Patent No.: US 6,179,494 B1
(45) Date of Patent: *Jan. 30, 2001

(54) CAMERA

(75) Inventor: Akira Egawa, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/714,673

(22) Filed: Nov. 19, 1996

Related U.S. Application Data (63) Continuation of application No. 08/651,008, filed on May 21, 1996, now abandoned, which is a continuation of application No. 08/417,458, filed on Apr. 5, 1995, now abandoned, which is a continuation of application No. 07/913,385, filed on Jul. 15, 1992, now abandoned.

(30) Foreign Application Priority Data

Jul. 19, 1991 (JP) ........................................ 3-203643
Jul. 19, 1991 (JP) ........................................ 3-203644

(51) Int. Cl.$^7$ ................................................. G03B 17/26
(52) U.S. Cl. ......................... 396/514; 396/515; 396/538
(58) Field of Search ................................. 396/390, 511, 396/512, 514, 515, 516

(56) References Cited

U.S. PATENT DOCUMENTS

| | | | |
|---|---|---|---|
| 3,894,796 | * 7/1975 | Cook et al. ..................... | 352/78 R |
| 4,834,306 | 5/1989 | Robertson et al. .............. | 242/71.1 |
| 4,994,828 | * 2/1991 | Smart ............................. | 354/275 |
| 5,030,978 | * 7/1991 | Stoneham et al. .............. | 396/514 |
| 5,047,794 | * 9/1991 | Pagano et al. .................. | 354/275 |
| 5,049,912 | * 9/1991 | Pagano et al. .................. | 396/514 |
| 5,115,268 | * 5/1992 | Kitagawa et al. ............... | 354/275 |
| 5,475,454 | * 12/1995 | Ezawa ............................ | 396/515 |
| 5,483,310 | * 1/1996 | Tanii et al. ..................... | 396/515 |

FOREIGN PATENT DOCUMENTS

| 2-114248 | 4/1990 | (JP) . |
|---|---|---|
| 3-67535 | 3/1991 | (JP) . |

* cited by examiner

*Primary Examiner*—David M. Gray
(74) *Attorney, Agent, or Firm*—Fitzpatrick, Cella, Harper & Scinto (57) ABSTRACT

The display of the state of use of film provided on a film cartridge is prevented from becoming a wrong display during the insertion of the film cartridge into a camera or during the removal of the film cartridge from the camera. Rotation restraint releasing means 20 are provided for bearing against rotation restraining means only while a supply spool 2 is engaged by the fork member 13 of the camera, and releasing the rotation restraint of the supply spool by the rotation restraining means, and this rotation restraint is released only in a state in which the supply spool is engaged by the fork member of the camera and the supply spool is not inadvertently rotated.

41 Claims, 12 Drawing Sheets

CAMERA

This application is a continuation of application Ser. No. 08/651,008 filed May 21, 1996, which is a continuation of application Ser. No. 08/417,458 filed Apr. 5, 1995, which is a continuation of application Ser. No. 07/913,385 filed Jul. 15, 1992, all now abandoned.

BACKGROUND OF THE INVENTION

1. Field of the Invention

This invention relates to a camera using a film cartridge provided with rotatable display means rotatable with a supply spool in the film cartridge and displaying by its rotated position whether the film is unused or used, and rotation restraining means for preventing said supply spool from being rotated except during the loading with the camera.

2. Related Background Art

A film cartridge designed such that whether the film therein is unused or used is displayed by a member movable in response to the rotation of a supply spool in the film cartridge is proposed in Japanese Laid-Open Patent Application No. 2-114248.

In the above-described example of the prior art, it is necessary that a member for locking the rotation of the supply spool be provided in the film cartridge to prevent the supply spool from being inadvertently rotated to thereby change the display, that is, to prevent the occurrence of the deviation of the relative position of the member movable with the supply spool and (the outer cover of) the film cartridge, when the film cartridge is removed from the camera and is a single piece.

Accordingly, to load the camera with the film cartridge and start the feeding of the film, said lock member must be released.

However, the film twines around the supply spool and therefore, tension is created in the direction of rotation of the supply spool and thus, the supply spool is rotated upon unlocking and the relative position of the member movable with the supply spool and (the outer cover of) the film cartridge is changed, and this has led to the possibility of displaying wrong information. Particularly when the information as to whether the film is unused one or used one is changed by mistake, it will result in a serious error such as double exposure.

SUMMARY OF THE INVENTION

It is an aspect of the present invention to provide, in view of the above-noted point, a camera in which the phenomenon that the display of the state of use of film is erroneously read and the film is double-exposed can be prevented.

Also, when loading a camera with a film cartridge, the fork of the camera sometimes is not in complete mesh engagement with a supply spool and this may cause slippage between the fork and the supply spool, which is thus rotated. Also, when removing the film cartridge from the camera, the stopped position of the supply in the film cartridge is controlled by the rotation of the fork and particularly, during the rewinding of film, tension remains in the film and therefore, in the case of such structure that lock works when the film cartridge is taken out with the cartridge lid of the camera opened, the fork also comes out at the same time, and this has led to a result that with a delicate deviation of timing, the position of the supply spool is changed by the tension of the film rolled in.

It is an another aspect of the present invention to provide, in view of the above-noted point, a camera in which the phenomenon that the display of the state of use of film in a film cartridge becomes wrong by deviating during the loading of the camera with the film cartridge or during the removal of the film cartridge from the camera can be prevented.

DESCRIPTION OF THE PREFERRED EMBODIMENTS

First Embodiment

FIGS. 1 to 5 show a first embodiment of the present invention.

Figure 1:
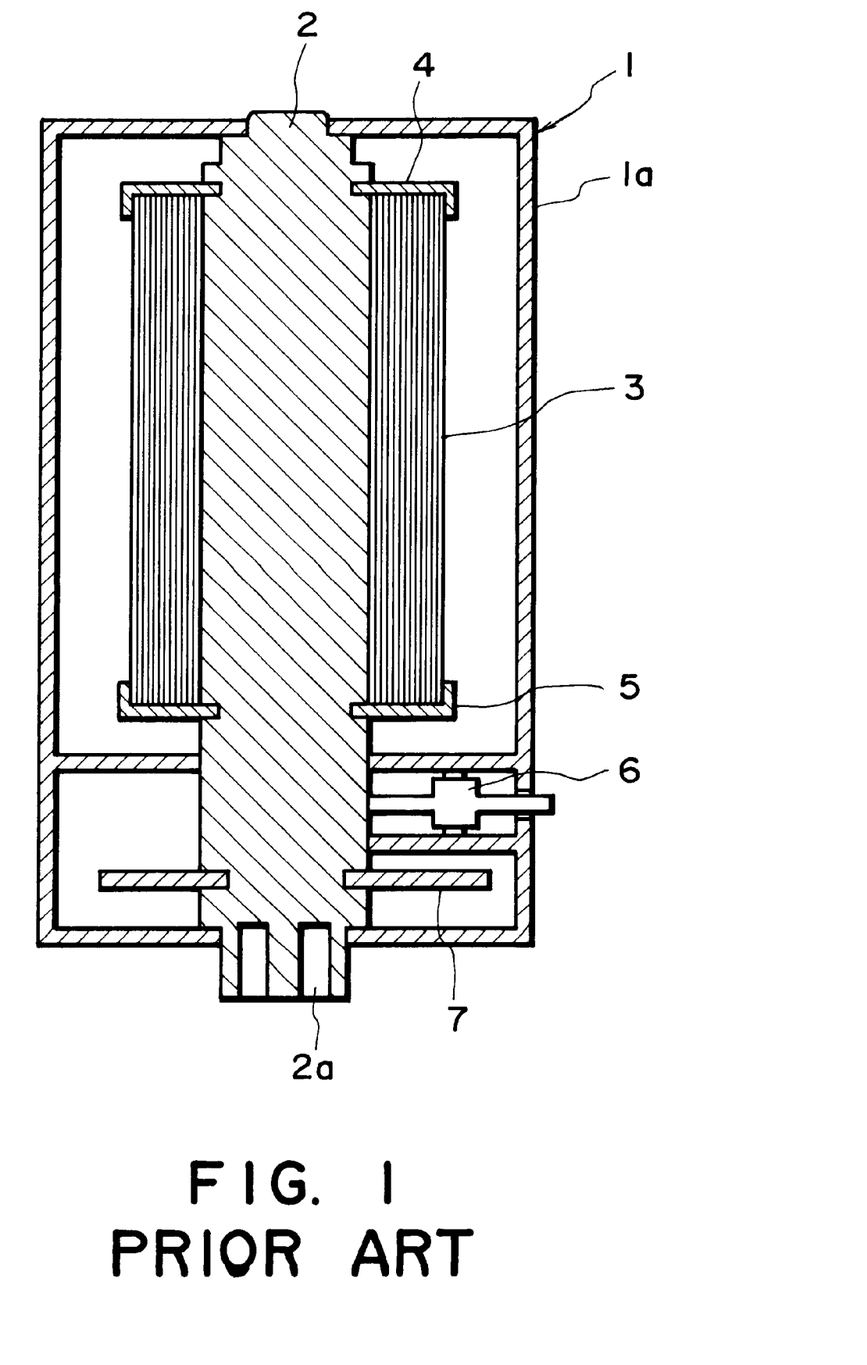
FIG. 1 is a vertical cross-sectional view of a film cartridge of the thrust type used in the present invention.

FIG. 1 is a vertical cross-sectional view of a type of film cartridge used in the present embodiment, and this type of cartridge is the following one proposed in U.S. Pat. No. 4,834,306, etc.

The film cartridge is provided with a film passage slit, film having one end thereof secured to a supply spool and wound on the supply spool, a keep member disposed coaxially with the supply spool for regulating the expanse of the outermost periphery of the film in the radial direction thereof by a regulating portion and preventing the outermost periphery of the film from substantially contacting with the inner wall of the film cartridge, a releasing portion for deforming a portion of the keep member and continuously releasing the outermost peripheral portion of the film from the regulation in the radial direction by the keep member, and a directing portion for directing that portion of the film which has been released from the regulation to the film passage slit, and in this film cartridge, the outer periphery of the film and the keep member are made free of slippage relative to each other by the expanse of the outermost periphery of the film caused by the loosening of the winding of the film which in turn is caused by the rotation of the spool in a direction to push out the film, whereby a drive force in the direction to push out the film is imparted to the film, thereby enabling the film to be pushed out of the film cartridge. The film cartridge of this kind which can discharge film by the rotation of the supply spool will hereinafter be called the push-out type (thrust type) film cartridge.

Figure 2:
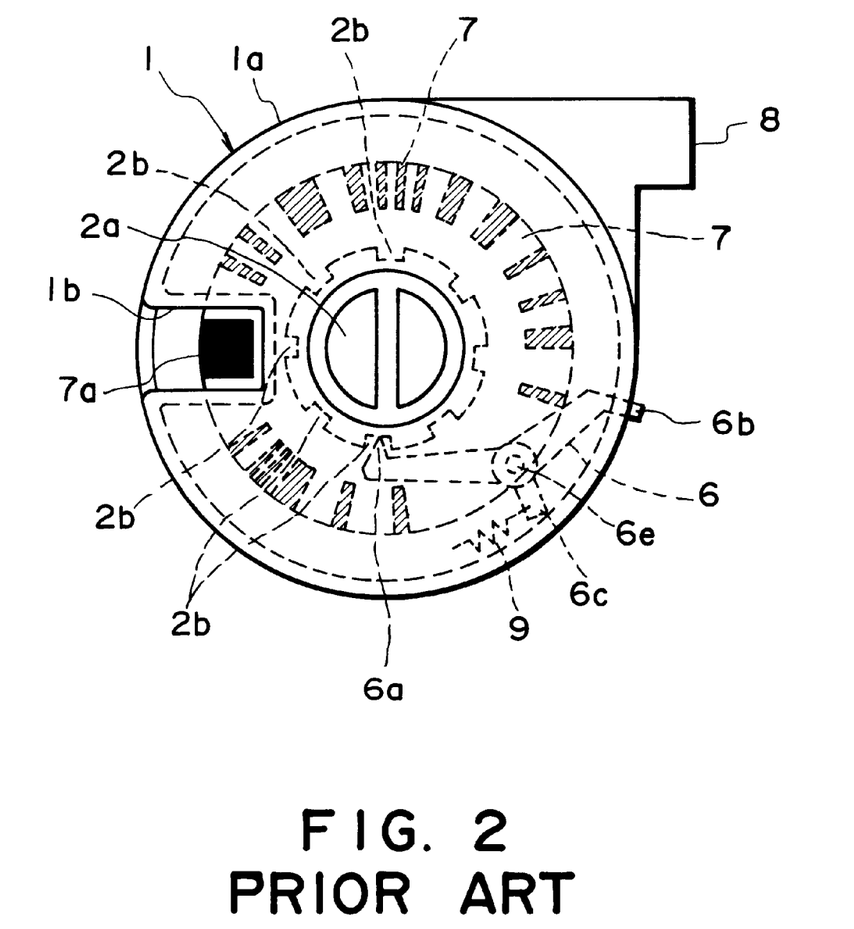
FIG. 2 is a bottom plan view of the film cartridge of FIG. 1.
Figure 3:
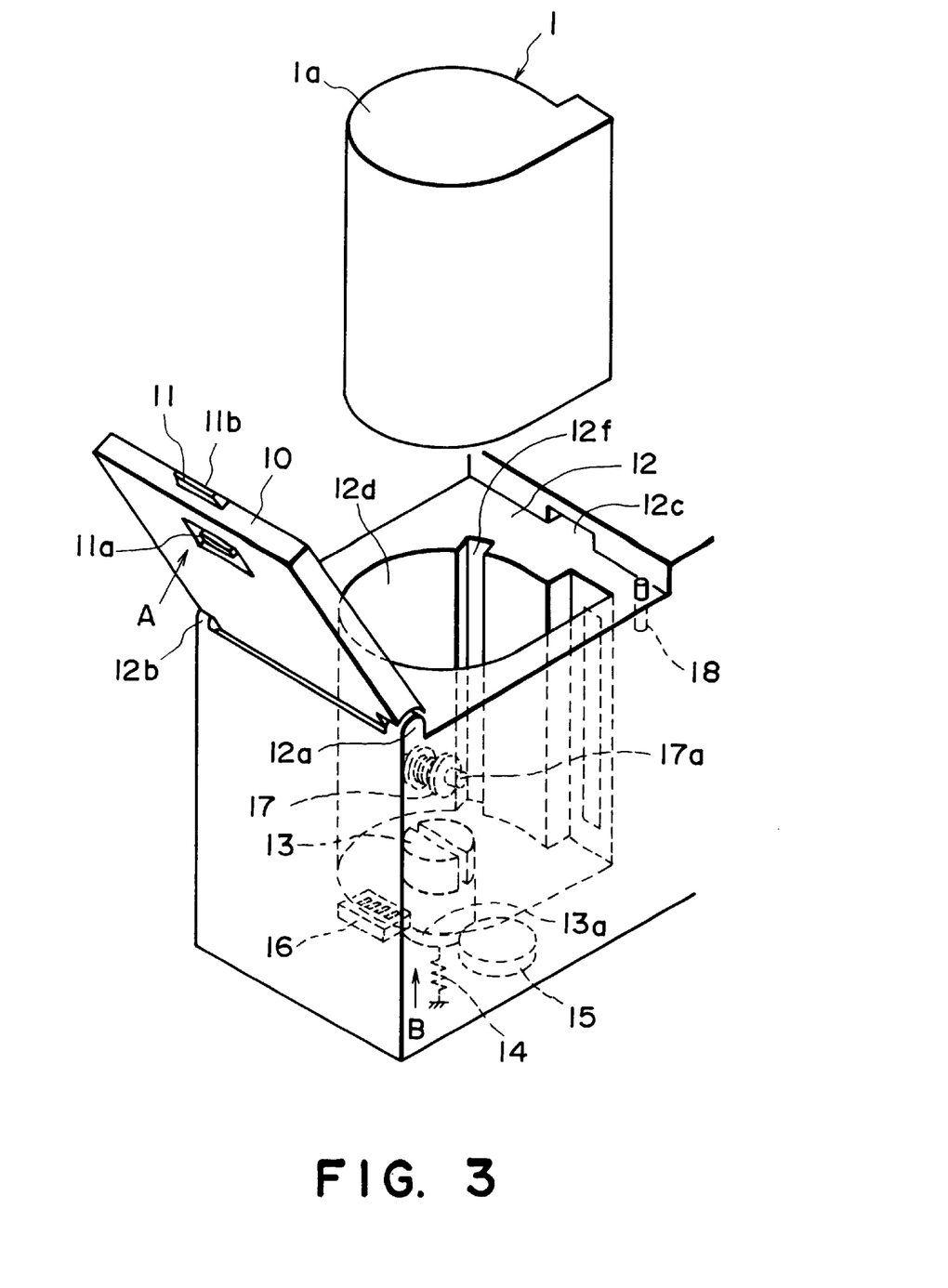
FIG. 3 is a perspective view of a cartridge chamber in a camera according to a first embodiment of the present invention into which the film cartridge of FIG. 1 is inserted.

FIG. 2 is a bottom plan view of this thrust type film cartridge, and FIG. 3 is a perspective view of the cartridge chamber of a camera into which the film cartridge is inserted.

In these figures, the reference numeral 1 designates the thrust type film cartridge as previously described, and the reference character 1*a* denotes the outer cover thereof formed with a cut-away portion 1*b* through which a part of a rotatable disk 7 to be described is exposed. The reference numeral 2 designates a supply spool, the reference numeral 3 denotes film, the reference numerals 4 and 5 designate keep members formed of an elastic material, the reference numeral 6 denotes a rotation restraining lever having a portion 6*e* as the center of rotation and pivotally mounted in the film cartridge 1, and the reference numeral 7 designates a rotatable disk secured to the supply spool 2 and having its rotated position controlled in conformance with the state of use of the film 3. As shown in FIG. 2, information regarding the film is recorded in the form of a bar-code on the rotatable disk 7.

The pawl portion 6*a* of the rotation restraining lever 6 is engaged with a groove 2*b* in the supply spool 2 to thereby regulate the rotation of the supply spool 2 so that even when the film 3 is in its used state or its unused state, the supply spool 2 may not inadevertently rotate to change the position of the rotatable disk 7. Also, design is made such that the discrimination between the used state and the unused state of the film 3 is detected by the position of the black wide portion 7*a* of the bar-code on the rotatable disk 7.

The reference numeral 8 denotes a film passage slit, and the reference numeral 9 designates a spring having one end thereof attached to the arm 6*c* of the rotation restraining lever 6 and the other end attached to the cover of the film cartridge 1 and imparting a clockwise biasing force to the rotation restraining lever 6 as viewed in FIG. 2. The reference numeral 10 denotes the lid of the cartridge chamber which is pivotally mounted on the portions 12*a* and 12*b* of a camera body to be described.

The reference numeral 11 designates an opening-closing knob formed of an elastic material for opening and closing the cartridge chamber lid 10. The opening-closing knob 11 is of such structure that by the knob portion 11*a* thereof being operated by the user, the pawl portion 11*b* thereof is slidden in the cartridge chamber lid 10, i.e., put into and out of the cartridge chamber. This pawl portion 11*b* is engageable with an engagement hole 12*c* in the camera body 12 to be described, and by the engagement hole 12*c* being engaged by the pawl portion 11*b,* the cartridge chamber lid 10 is locked into its closed state.

The camera body 12 has a cartridge chamber 12*d* and an escape groove 12*f* located at a position corresponding to the protruding portion 6*b* of the rotation restraining lever 6. The reference numeral 13 denotes a fork having a fork portion engaged with the spline portion 2*a* of the supply spool 2, and biased toward the cartridge chamber lid 10 by a compression spring 14 as shown in FIG. 3. The reference numeral 15 designates a fork driving gear which is in mesh engagement with the gear portion 13*a* of the fork 13 and a film feeding gear train, not shown. The film feeding gear train is, for example, that proposed in Japanese Patent Application No. 63-220047,etc.

The reference numeral 16 denotes a linear sensor comprising, for example, a CCD for detecting the bar-code on the rotatable disk. The detection of the width of the bar-code for discriminating the state of use of the film is possible even if the rotatable disk 7 is not rotated. That is, whether the black wide portion 7*a* indicative of the beginning of the bar-like is present in the cut-away portion 1*b*, that is, whether the film 3 is used one or unused one, can be detected even if the rotatable disk 7 is not rotated. The reference numeral 17 designates a plunger for controlling the protruding portion 6*b* of the rotation restraining lever 6 and releasing the restraint of the supply spool 2. These are disposed at the locations as shown in FIG. 3. The reference numeral 18 denotes a pin for detecting the opening and closing of the cartridge chamber lid 10. A switch 49 to be described is closed and opened in response to the movement of the pin 18.

Figure 4:
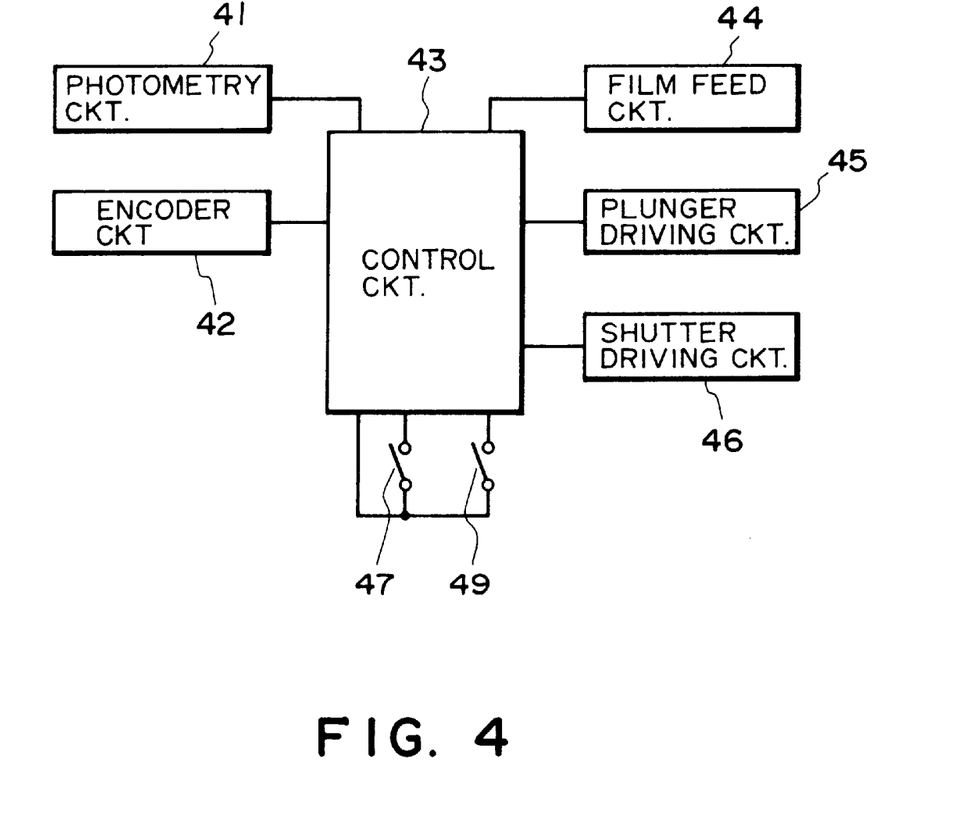
FIG. 4 is an electrical block diagram of the camera according to the first embodiment of the present invention.

FIG. 4 is an electrical block diagram of a camera according to the first embodiment of the present invention.

In FIG. 4, the reference numeral 41 denotes a photometry circuit for measuring the brightness of an object, the reference numeral 42 designates an encoder circuit to which a bar-code signal is input from the output of the linear sensor 16, the reference numeral 43 denotes a control circuit such as a microcomputer for controlling the various operations of the camera, the reference numeral 44 designates a film feed circuit for controlling a motor, not shown, to rotate the fork 13 of the camera and the supply spool 2 and effect the feeding of the film 3, the reference numeral 45 denotes a plunger driving circuit for controlling the plunger 17 to release the restraint of the rotation of the supply spool 2 by the protruding portion 6*b* of the rotation restraining lever 6, the reference numeral 46 designates a shutter driving circuit for controlling the exposure of the film surface, the reference numeral 47 denotes a switch operatively associated with the release button of the camera, and the reference numeral 49 designates a switch operatively associated with the pin 18 for detecting the state of the cartridge chamber lid 10.

Figure 5:
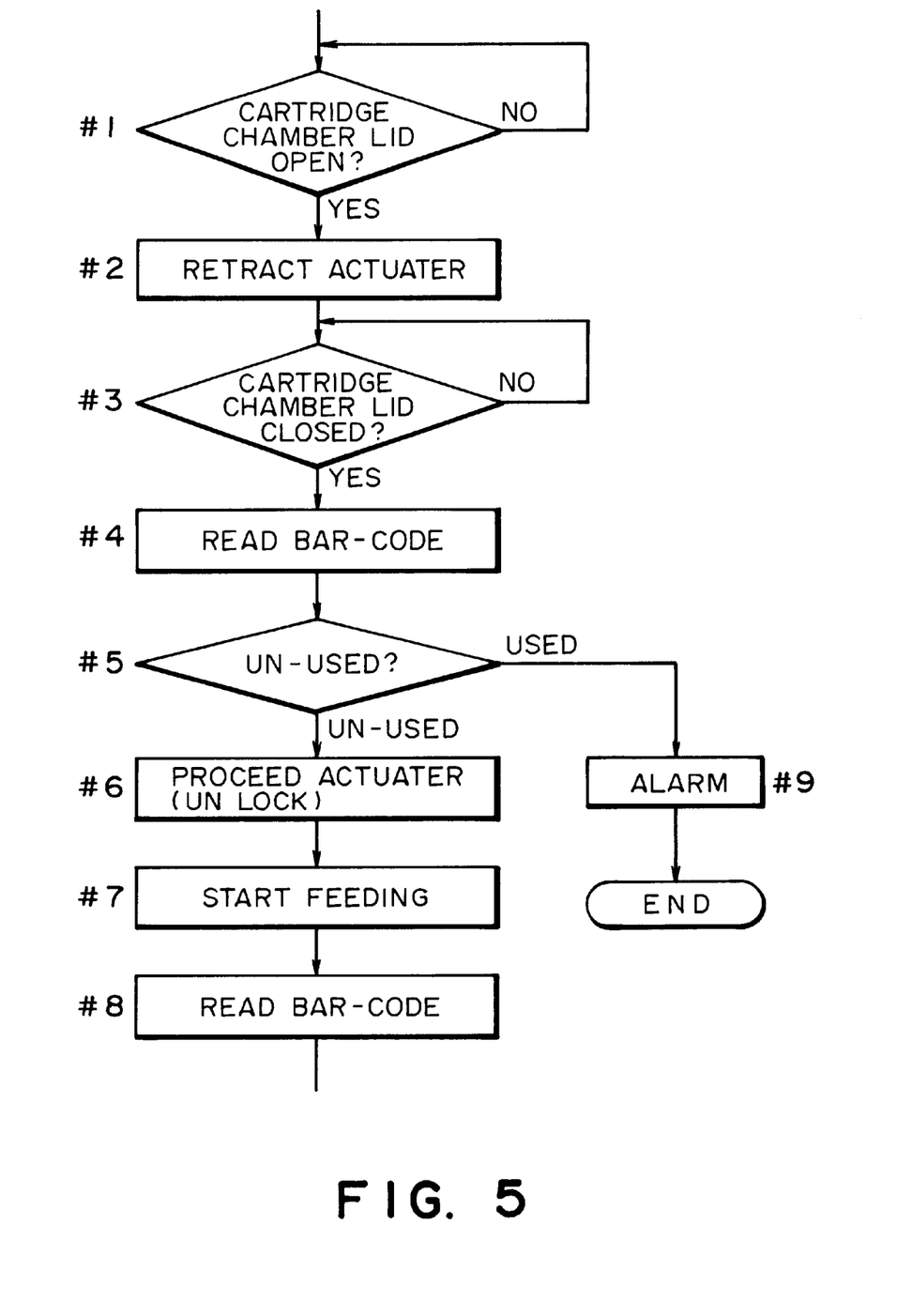
FIG. 5 is a flow chart showing the operations of some of the essential portions of the control circuit of FIG. 4.

The operations of those portions of the control circuit 43 which are according to the present invention will now be described with reference to the flow chart of FIG. 5.

"Step 1" In order to insert the film cartridge 1 into the cartridge chamber 12*d* of the camera, whether the cartridge chamber lid 10 has been opened is discriminated from the state of the switch 49. By the fact that the cartridge chamber lid has been opened being discriminated, advance is made to the next step 2.

"Step 2" The plunger 17 is controlled through the plunger driving circuit 45 so that the actuator portion 17*a* (see FIG. 3) of the plunger 17 may be retracted from within the escape groove 12*f.* Thereby, the film cartridge 1 becomes insertable into the cartridge chamber 12*d* with the supply spool 2 of the film cartridge remaining restrained by the rotation restraining lever 6. In other words, this is an operation for preventing the rotation restraining lever 6 from bearing against the actuator portion 17*a* of the plunger 17 in the course of the insertion of the film cartridge 1 to release the restraint of the supply spool 2.

"Step 3" Whether, after the film cartridge 1 has been inserted, the cartridge chamber lid 10 has been closed is discriminated from the state of the switch 49. When the fact that the cartridge chamber lid has been closed is discriminated, advance is made to the next step 4.

"Step 4" A bar-code signal detected by the linear sensor 16 is read through the encoder circuit 42. That is, at this step, the bar-code signal is read to detect whether the black wide portion 7*a* indicative of the beginning of the bar-code is in the cut-away portion 1*b*.

"Step 5" Whether the black wide portion 7*a* indicative of the beginning of the bar-code is in the cut-away portion 1*b* is examined from the bar-code signal read at the step 4, and the state of use of the film is discriminated. If as a result, the film 3 is unused one, advance is made to a step 6, and if the film 3 is used one, advance is made to a step 9.

"Step 6" The plunger 17 is controlled through the plunger driving circuit 45 to bring the actuator 17a into the escape groove 12f, and the rotation restraining lever 6 in the film cartridge 1 is rotated counter-clockwisely as viewed in FIG. 2 to thereby bring the pawl portion 6a of the rotation restraining lever 6 out of engagement with the groove 2b of the supply spool 2. That is, the locking of the rotation of the supply spool 2 is released.

"Step 7" The film feed circuit 44 is driven to start the feeding of the film 3.

Here, the film cartridge 1 used in the present invention contains all the film therein at first, and when this film cartridge 1 is inserted into the camera, the operation of the step 7 for pushing out the film 3 from within the film cartridge 1 onto a film take-up spool (not shown) is started. At this time, the fork 13 is sometimes not engaged with the spline portion 2a of the supply spool 2, but the engagement therebetween will naturally take place as the fork 13 is rotated.

"Step 8" The bar-code signal detected by the linear sensor 16 is read through the encoder 42. That is, at this step, the bar-code signal is read to detect the information regarding the film (such as a regulated frame number and film speed) from the rotating rotatable disk 7.

Thereafter, a series of photographing operations are started.

Also, if at the step 5, the film 3 was used one, advance is made to a step 9 as previously described.

"Step 9" At this step, the alarm to the effect that a used film cartridge 1 has been inserted by mistake is effected by the use of means, not shown, to inform the photographer. The operation of the camera is then ended.

Figure 6:
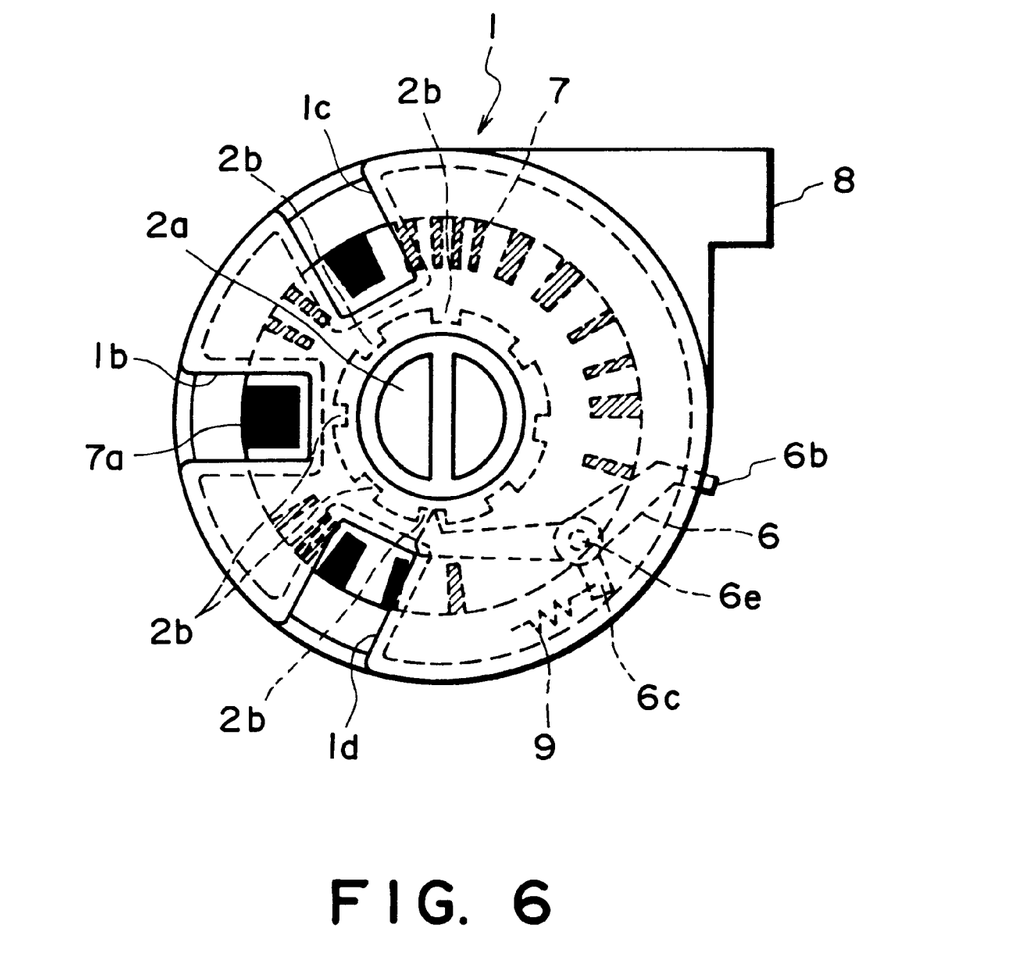
FIG. 6 shows a modification of the cartridge.

FIG. 6 shows another example of the construction of the film cartridge used in the present embodiment. This example differs from the film cartridge shown in FIG. 1 in that besides the cut-away portion 1b, two cut-away portions 1c and 1d are provided in the outer cover 1a and that on the camera side, the film is discriminated as "unused" if the wide portion 7a of the bar-code is at the position of the cut-away portion 1b, the film is discriminated as "used" if the wide portion 7a is at the position of the cut-away portion 1c, and the film is discriminated as "partially used" if the wide portion 7a is at the position of the cut-away portion 1d. In this case, on the camera side, there are provided such linear sensors 16 as shown in FIG. 3 at locations opposed to the respective cut-away portions 1c and 1d.

Figure 7:
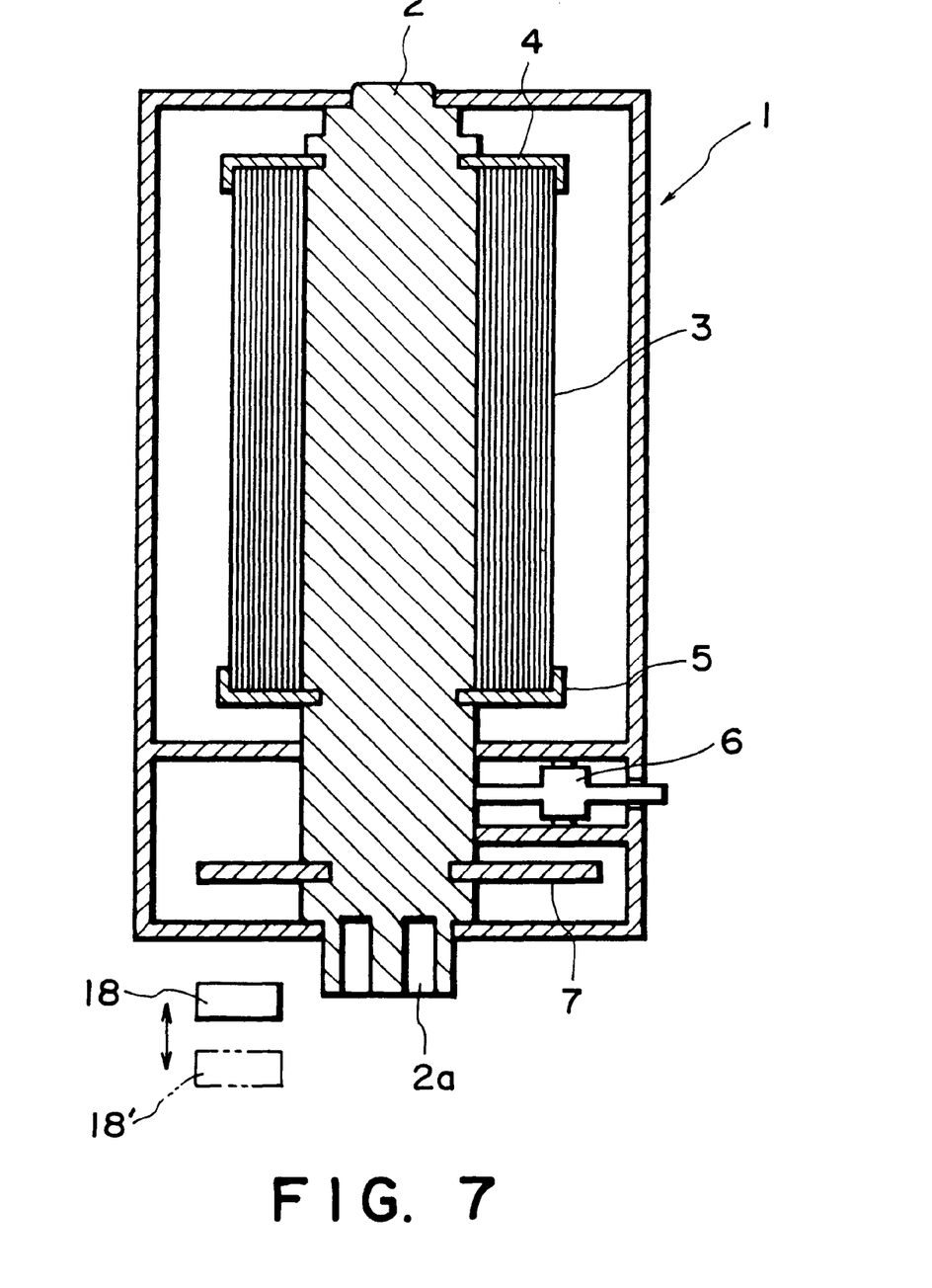
FIG. 7 shows a modification of a bar-code reading mechanism.

FIG. 7 is a view for illustrating a bar-code reading mechanism when the cartridge as shown in FIG. 6 is used. The reference numeral 18 designates a photoreflector for detecting a thin bar-code. The photoreflector 18 when in its solid-line position of FIG. 7 is in focus on the bar-code and can detect even a thin bar-code with high resolving power. Denoted by 18' is the position of the photoreflector for detecting a thick bar-code (the wide portion 7a). When in this position, the photoreflector is in its defocus state with respect to the bar-code and the thin bar-code is averaged in light and shade to provide a medium level output, but with regard to the thick bar-code, design is made such that the defocus amount is not affected and thus, an output can be firmly obtained to accomplish detection.

According to the above-described embodiment, before the locking of the rotation of the supply spool 2 is released, the reading of the bar-code is effected to discriminate the state of use of the film, whereafter the locking of the rotation of the supply spool 2 is released and therefore, the relative position of the supply spool and the film cartridge can be detected accurately and thus, it becomes possible to prevent the phenomenon that a used film is used as if it were an unused one and is double-exposed.

As described above, according to the present embodiment, provision is made of discrimination means for reading the rotated state of rotatable display means and discriminating the state of use of the film, releasing means for bearing against rotation restraining means and releasing the restraint of the rotation of the supply spool by the rotation restraining means, and control means for operating said releasing means after the rotated state of said rotatable display means is read by said discrimination means, and in a state in which the supply spool is restrained by the rotation restraining means and is not inadvertently rotated, the reading of the rotated state of the rotatable display means is effected by the discrimination means, whereafter the restraint of the rotation is released. Consequently, it becomes possible to prevent the phenomenon that the display of the state of use of the film is erroneously read and the film is double-exposed.

Second Embodiment

Figure 8:
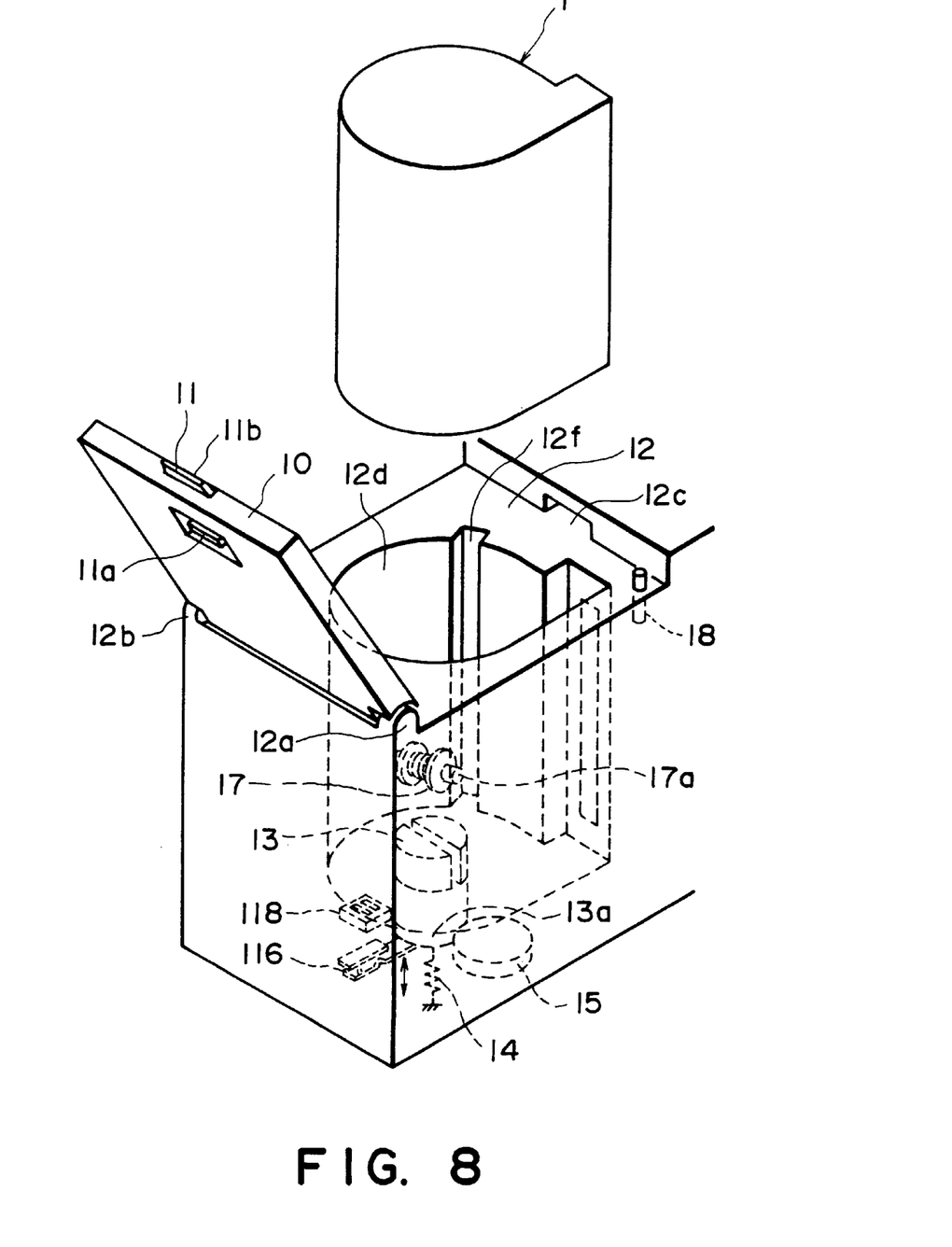
FIG. 8 is a perspective view of a cartridge chamber in a second embodiment of the present invention.

FIG. 8 is a perspective view of the cartridge chamber of a camera according to a second embodiment of the present invention.

The same numbers as those in the first embodiment are given the same reference numerals and need not be described.

The reference numeral 116 designates a switch adapted to be closed when the fork 13 comes into engagement with the spline portion 2a of the supply spool 2 and moves upwardly as viewed in FIG. 8. The reference numeral 118 denotes a reflection type photointerrupter for detecting through a cut-away portion 1b a bar-code provided on the rotatable disk 7 in the film cartridge 1.

Figure 9:
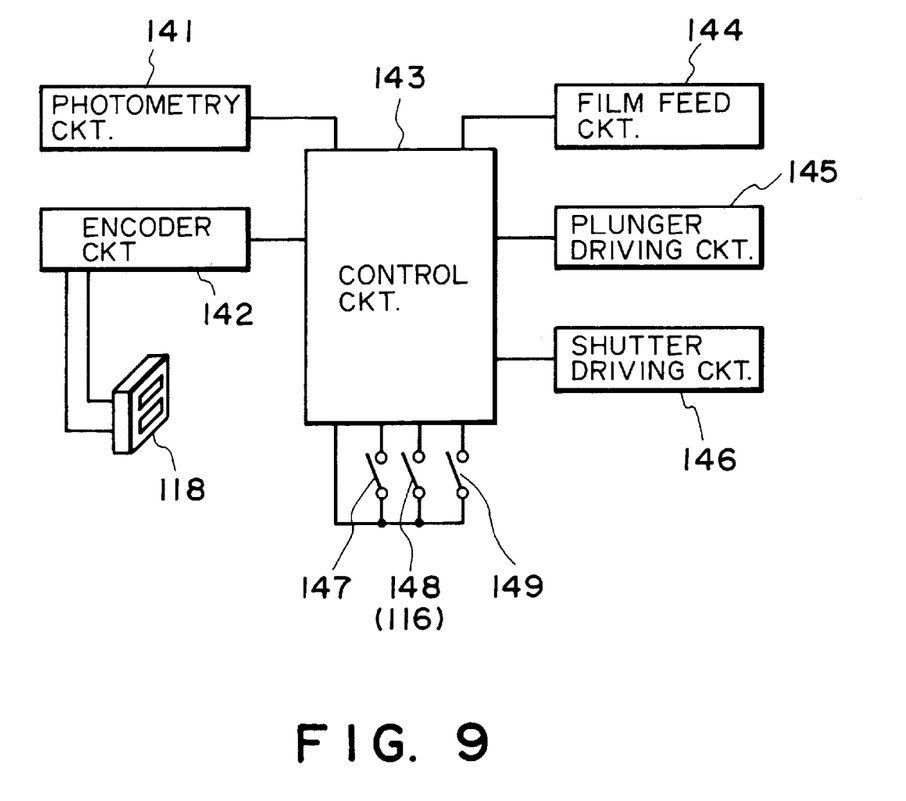
FIG. 9 is an electrical block diagram of the camera according to the second embodiment.

FIG. 9 is an electrical block diagram of the camera according to the second embodiment of the present invention.

In FIG. 9, the reference numeral 141 designates a photometry circuit for measuring the brightness of an object, the reference numeral 142 denotes an encoder circuit to which a bar-code signal is input from the output of the photointerrupter 118, the reference numeral 143 designates a control circuit such as a microcomputer for controlling the various operations of the camera, the reference numeral 144 denotes a film feeding circuit for controlling a motor, not shown, to rotate the fork 13 of the camera and the supply spool 2 and feed the film 3, the reference numeral 145 designates a plunger driving circuit for controlling the plunger 17 to release the restraint of the rotation of the supply spool 2 by the protruding portion 6b of the rotation restraining lever 6, the reference numeral 146 denotes a shutter driving circuit for controlling the exposure of the film surface, the reference numeral 147 designates a switch operatively associated with the release button of the camera, the reference numeral 148 denotes a switch corresponding to the switch 116 for detecting the state of the fork 13, and the reference numeral 149 designates a switch operatively associated with the pin 18 for detecting the state of the cartridge chamber lid 10.

Figure 10:
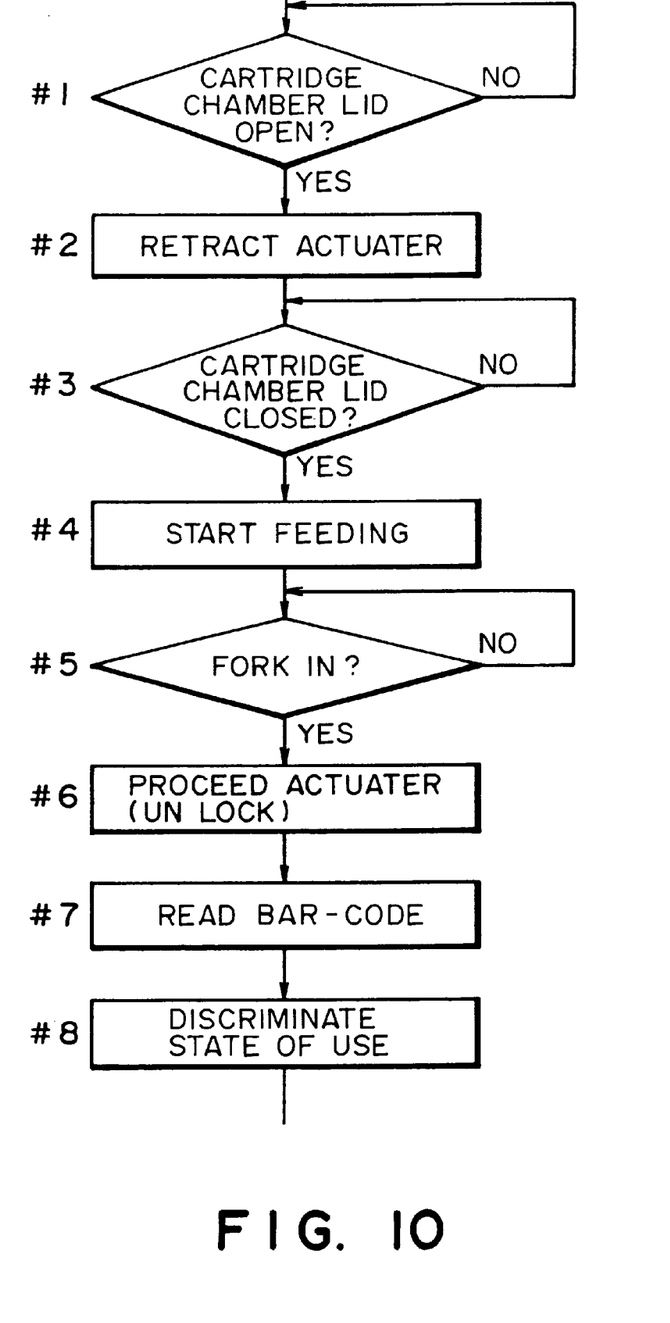
FIG. 10 shows a flow chart in the second embodiment.

The operations of portions of the control circuit 143 according to the present invention will now be described with reference to the flow chart of FIG. 10.

"Step 1" In order to insert the film cartridge 1 into the cartridge chamber 12d of the camera, whether the cartridge chamber lid 10 has been opened is discriminated from the state of the switch 149. By the fact that the cartridge chamber lid has been opened being discriminated, advance is made to the next step 2.

"Step 2" The plunger 17 is controlled through the plunger driving circuit 145 so that the actuator portion 17a (see FIG. 8) of the plunger 17 may be retracted from within the escape groove 12f. Thereby, the film cartridge 1 becomes insertable into the cartridge chamber 12d with the supply spool 2 of the film cartridge remaining restrained by the rotation restraining lever 6. In other words, this is an operation for preventing the rotation restraining lever 6 from bearing against the actuator portion 17a of the plunger 17 in the course of the insertion of the film cartridge 1 into the cartridge chamber 12d to release the restraint of the supply spool 2.

"Step 3" Whether, after the film cartridge 1 has been inserted the cartridge chamber lid 10 has been closed is discriminated from the state of the switch 149. When the fact that the cartridge chamber lid has been closed is discriminated, advance is made to the next step 4.

"Step 4" The film feeding circuit 144 is driven to start the feeding of the film 3.

Here, the film cartridge 1 used in the present invention contains all the film therein at first. When this film cartridge 1 is inserted into the camera, the operation of the step 4 is started in order to push out the film 3 from within the film cartridge 1 onto the film take-up spool (not shown) of the camera. At this point of time, the fork 13 is sometimes not engaged with the spline portion 2a of the supply spool 2, but yet the engagement therebetween will take place naturally as the fork 13 is rotated.

"Step 5" At this step, whether the fork 13 is engaged with the spline portion 2a of the supply spool 2 is discriminated from the state of the switch 148 (116), and if the switch 148 is ON, that is, if it is detected that the fork 13 is engaged with the spline portion 2a, advance is made to a step 6.

"Step 6" The plunger 17 is controlled through the plunger driving circuit 145 to bring the actuator portion 17a of the plunger into the escape groove 12f, and the rotation restraining lever 6 in the film cartridge 1 is rotated counter-clockwise as viewed in FIG. 2, whereby the pawl portion 6a of the rotation restraining lever 6 is brought out of engagement with the groove 2b of the supply spool 2. That is, the locking of the rotation of the supply spool 2 is released.

"Step 7" The operation of reading the bar-code on the rotatable disk 7 rotating in synchronism with the fork 13 by the photointerrupter 118 is started.

"Step 8" At this step, the relative position of the outer cover 1a of the film cartridge 1 and the rotatable disk 7 is found from the bar-code signal read at the step 7 to thereby discriminate the state of use of the film 3, whereafter the camera proceeds to respective sequences.

As described above, after the fork 13 has come into perfect engagement with the spline portion 2a, the bar-code is read to discriminate the state of use of the film and therefore, the rotation of the fork 13 and the rotation of the supply spool 2 are perfectly coincident with each other and no slippage occurs between these members, and it becomes possible to read the bar-code accurately through the encoder circuit 42. Also, after the fork 13 has come into perfect engagement with the spline portion 2a, the locking of the rotation of the supply spool 2 is released and therefore, it never happens that the supply spool 2 is inadvertently rotated by the tension of the film 3.

Figure 11:
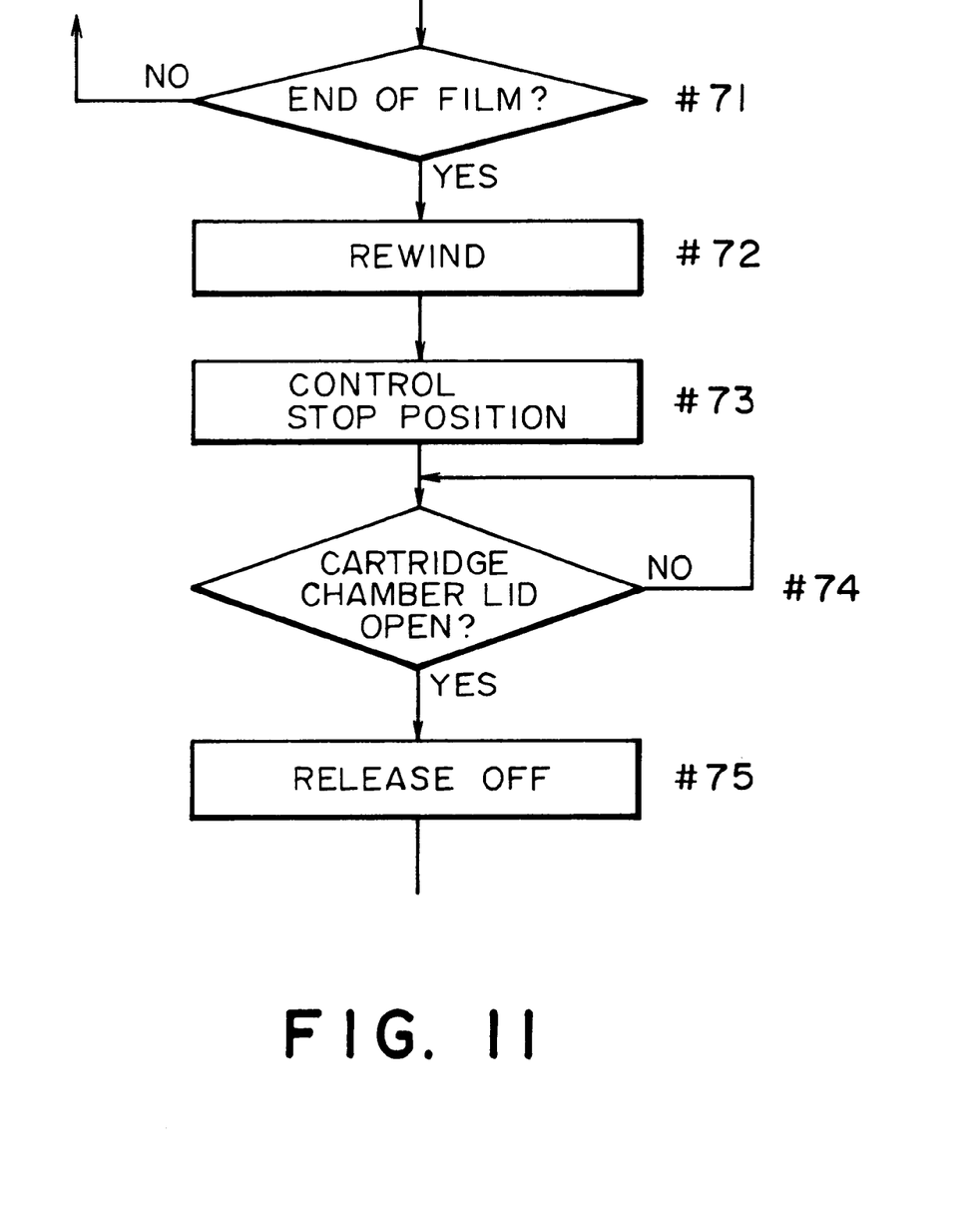
FIG. 11 shows a control flow chart when a cartridge is removed.

FIG. 11 is a flow chart showing the operations when the film is rewound and the film cartridge 1 is taken out of the cartridge chamber 12d.

"Step 71" For example, whether the photographing onto the film 3 has been completed is discriminated by the comparison between the regulated frame number and the current number of exposed frames, and if the photographing is not yet completed, return is made to the sequence prepared for the next photographing, and if it is discriminated that the photographing has been completed, advance is made to a step 72.

"Step 72" The film feeding circuit 144 is driven to start the rewinding of the film 3.

"Step 73" When it is detected that the winding of the film 3 into the film cartridge 1 has been completed, the rotated position of the supply spool 2 is controlled and the stopped position of the rotatable disk 7 on which the bar-code is recorded is brought to a position indicating that the film is used one, and the feeding of the film is stopped.

"Step 74" Whether the cartridge chamber lid 10 has been opened is discriminated from the state of the switch 149, and if it is discriminated that the lid 10 has been opened, advance is made to a step 75.

"Step 75" The actuator portion 17a of the plunger 17 is retracted from the escape groove 12f through the plunger driving circuit 145, and as shown in FIG. 7, the pawl portion 6a of the rotation restraining lever 6 is brought into the groove 2b of the supply spool 2 to thereby lock the rotation of the supply spool 2.

Thereby, it becomes possible to avoid the phenomenon that during the removal of the cartridge also, the supply spool 2 is inadvertently rotated by he tension or the like of the film 3 and the display of the state of use of the film becomes wrong.

Figure 12:
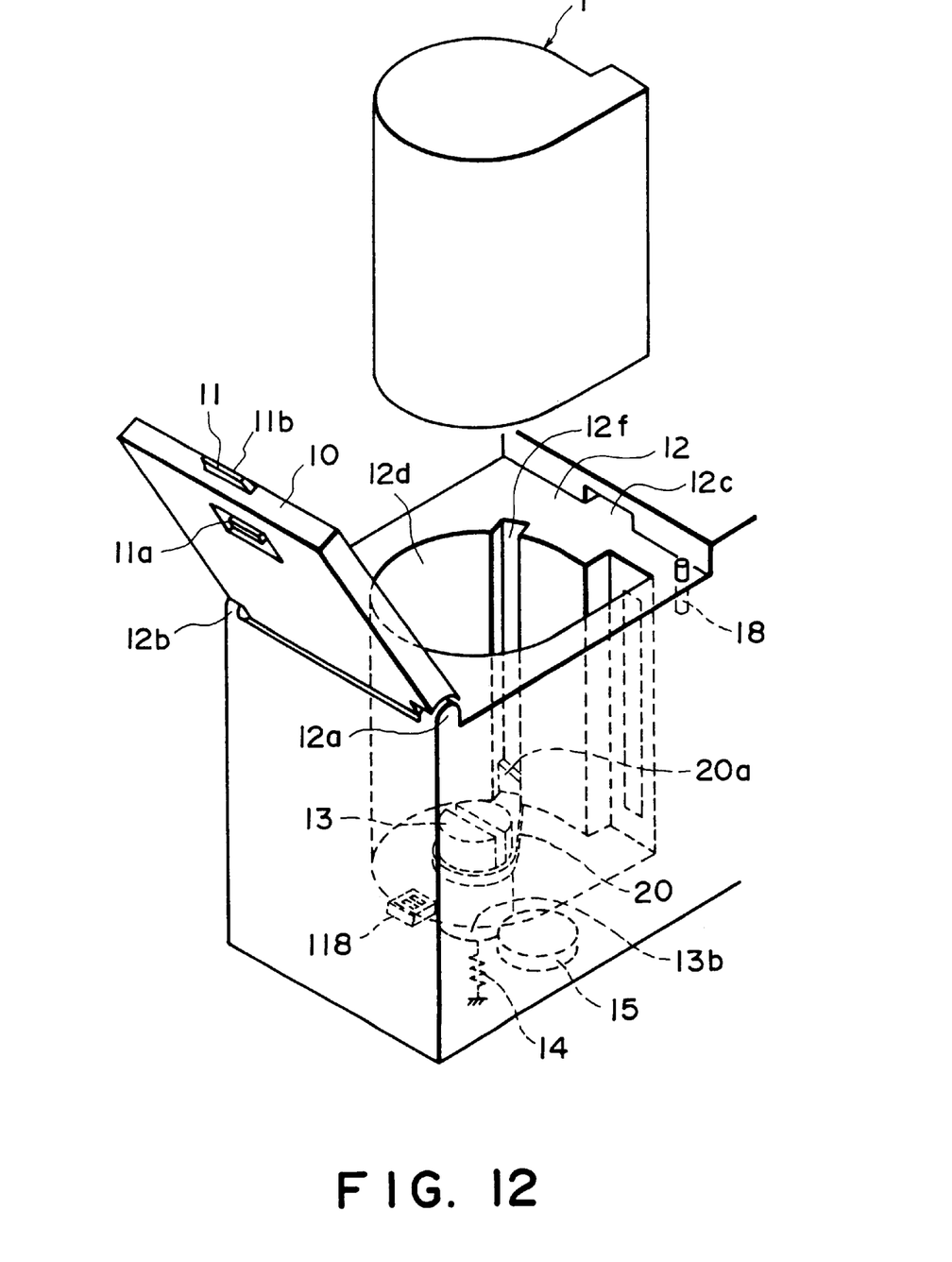
FIG. 12 shows a modification of the second embodiment.

FIG. 12 shows a modification of the present embodiment. In FIG. 12, the same portions as those in the second embodiment are given the same reference characters.

In FIG. 12, the reference numeral 20 designates a release lever having one end thereof rotatably mounted on the shaft portion of the fork 13 so that the release lever may move up and down in response to the upward and downward movement of the fork 13. The other end 20a of the release lever 20 is bent into an L-shape and the tip end (20a) thereof is of an obliquely cut shape. The rotation restraining lever 6 (not shown in FIG. 12) provided in the film cartridge 1 is designed to be controlled by the tip end 20a with the upward and downward movement of the fork 13.

That is, as the fork 13 comes into engagement with the spline portion 2a of the supply spool 2 and is slid upwardly as viewed in FIG. 12 by the biasing force of the compression spring 14, the release lever 20 also moves upwardly, and at this time, the tip end 20a thereof bears against the protruding portion 6b of the rotation restraining lever 6 to rotate the same counter-clockwise, thereby bringing the pawl portion 6a of the rotation restraining lever 6 out of engagement with the groove 2b of the supply spool 2. That is, the locking of the rotation of the supply spool 2 is released.

Also, during the removal of the film cartridge from the camera, in the course in which the film cartridge 1 is taken out with the cartridge chamber lid 10 being opened, the pressing of the protruding portion of the rotation restraining lever 6 by the tip end 20a of the release lever 20 is released and therefore, as shown in FIG. 7, the pawl portion 6a of the rotation restraining lever 6 is brought into the groove 2b of the supply spool 2 by the biasing force of the spring 9 and thus, the rotation of the supply spool is locked.

Thereby, as in the previous embodiment, it becomes possible to avoid the phenomenon that during the removal of the cartridge also, the supply spool 2 is inadvertently rotated and the display of the state of use of the film becomes wrong.

As described above, according to the second embodiment of the present invention, provision is made of rotation restraint releasing means for bearing against rotation restraining means only while the supply spool is engaged with the fork member of the camera, and releasing the rotation restraint of the supply spool by said rotation restraining means, and provision is also made of release means for bearing against the rotation restraining means and releasing the rotation restraint of the supply spool by said rotation restraining means, and control means for operating said release means only while the supply spool is engaged with the fork member of the camera, whereby the rotation restraint is released only in a state in which the supply spool is properly engaged with the fork member of the camera and the supply spool is not inadvertently rotated. Consequently, the display of the state of use of the film in the film cartridge can be prevented from being displaced the wrong display during the insertion of the cartridge into the camera or during the removal of the cartridge from the camera. Thus, the accident that used film is again used and is double-exposed is eliminated.

What is claimed is:

1. An apparatus usable with a cartridge having a rotor for moving an image recording medium, an index that is rotated integrally with the rotor, and a regulation device that regulates rotation of the index, the apparatus comprising:
   (a) an engagement device engageable with the rotor of a cartridge being used with the apparatus, for rotatably driving the rotor;
   (b) an operation device that is movable and causes the regulation device to inhibit rotation of the index of a cartridge being used with the apparatus in a state where said engagement device is engaged with the rotor of the cartridges, said operation device being operable independent of said engagement device; and
   (c) a reading device that reads the index of a cartridge being used with the apparatus in a state where the index is rotated.

2. An apparatus according to claim 1, wherein said engagement device is engageable with the rotor of a cartridge being used with the apparatus, for moving an image recording medium that comprises a film.

3. An apparatus according to claim 1, wherein said reading device determines a state of the index of a cartridge loaded for used with the apparatus, after the cartridge has been loaded.

4. An apparatus according to claim 3, further comprising means for changing a manner of a feeding operation of the image recording medium in accordance with a determination result by said reading device.

5. An apparatus according to claim 3, further comprising means for regulating a feeding operation of the image recording medium in accordance with a determination result of said reading device that the image recording medium has been used.

6. An apparatus according to claim 3, further comprising means for regulating a photographing operation in accordance with a determination result of said reading device that the image recording medium has been used.

7. An apparatus according to claim 3, further comprising means for providing information that the image recording medium has been used, in accordance with a determination result of said reading device that the image recording medium has been used.

8. An apparatus according to claim 3, wherein said reading device comprises a photosensor.

9. An apparatus according to claim 3, wherein said reading device comprises a bar-code reader.

10. An apparatus according to claim 1, wherein said engagement device comprises a fork.

11. An apparatus according to claim 1, wherein said operation device is operable in response to an operation of a lid of a cartridge loading chamber.

12. An apparatus according to claim 1, wherein said operation device comprises an electric control operating device.

13. An apparatus according to claim 1, wherein said operation device comprises means for initiating an operation before a discharge operation of a cartridge being used with the apparatus from a cartridge loading chamber is started.

14. An apparatus according to claim 1, wherein the apparatus comprises a camera.

15. An apparatus according to claim 1, wherein the apparatus comprises a device to be adapted to a camera.

16. An apparatus usable with a cartridge having a rotor for moving an image recording medium, an index that is rotated integrally with the rotor, and a regulation device that regulates rotation of the index, the apparatus comprising:
   an operating device that selectively sets the regulation device of a cartridge being used with the apparatus in one of a state for inhibiting rotation of the index of the cartridge and a state for not inhibiting rotation of the index of the cartridge; and
   a control device for electrically controlling said operating device.

17. An apparatus according to claim 16, wherein the operating device comprises a plunger.

18. An apparatus according to claim 16, further comprising an engagement device engageable with the rotor of a cartridge being used with the apparatus, for moving an image recording medium that comprises a film.

19. An apparatus according to claim 16, further comprising determination means for determining a state of the index of a cartridge loaded for use with the apparatus, after the cartridge has been loaded.

20. An apparatus according to claim 19, further comprising means for changing a manner of a feeding operation of the image recording medium in accordance with a determination result by said determination means.

21. An apparatus according to claim 19, further comprising means for regulating a feeding operation of the image recording medium in accordance with a determination result of said determination means that the image recording medium has been used.

22. An apparatus according to claim 19, further comprising means for regulating a photographing operation in accordance with a determination result of said determination means that the image recording medium has been used.

23. An apparatus according to claim 19, further comprising means for providing information indicating that the image recording medium has been used, in accordance with a determination result of said determination means that the image recording medium has been used.

24. An apparatus according to claim 19, wherein the determination means comprises a photosensor.

25. An apparatus according to claim 19, wherein the determination means comprises a bar-code reader.

26. An apparatus according to claim 16, wherein said control device electrically controls said operating device in response to an operation of a lid of a cartridge loading chamber.

27. An apparatus according to claim 16, wherein said control device initiates an operation of said operating device after a cartridge being used with the apparatus has been loaded into a cartridge loading chamber.

28. An apparatus according to claim 16, wherein said control device initiates an operation of said operating device before a discharge operation of a cartridge being used with the apparatus from a cartridge loading chamber is started.

29. An apparatus according to claim 16, wherein the apparatus comprises a camera.

30. An apparatus according to claim 16, wherein the apparatus comprises a device to be adapted to a camera.

31. An apparatus usable with a cartridge having a rotor for moving an image recording medium, an index that is rotated integrally with the rotor, and a regulation device that regulates rotation of the index, the apparatus comprising:

an engagement device engageable with the rotor of a cartridge being used with the apparatus, for rotatably driving the rotor;

an operation device that is movable and causes the regulation device to cease inhibiting rotation of the index of a cartridge being used with the apparatus after the cartridge has been loaded into a cartridge loading chamber, said operation device being operable independent of said engagement device; and a reading device that reads the index of a cartridge being used with the apparatus, in a state where the index is rotated.

32. An apparatus according to claim 31, wherein said engagement device is engageable with the rotor of a cartridge being used with the apparatus, for moving an image recording medium that comprises a film.

33. An apparatus according to claim 31, wherein said reading device determines a state of the index of a cartridge loaded for use with the apparatus after the cartridge has been loaded.

34. An apparatus according to claim 33, further comprising means for changing a manner of a feeding operation of the image recording medium in accordance with a determination result by said reading device.

35. An apparatus according to claim 33, further comprising means for regulating a feeding operation of the image recording medium in accordance with a determination result of said reading device that the image recording medium has been used.

36. An apparatus according to claim 33, further comprising means for regulating a photographing operation in accordance with a determination result of said reading device that the image recording medium has been used.

37. An apparatus according to claim 33, further comprising means for providing information that the image recording medium has been used, in accordance with a determination result of said reading device that the image recording medium has been used.

38. An apparatus according to claim 33, wherein said reading device comprises a photosensor.

39. An apparatus according to claim 33, wherein said reading device comprises a bar-code reader.

40. An apparatus according to claim 31, wherein the apparatus comprises a camera.

41. An apparatus according to claim 31, wherein the apparatus comprises a device to be adapted to a camera.

* * * * *

UNITED STATES PATENT AND TRADEMARK OFFICE
CERTIFICATE OF CORRECTION

PATENT NO. : 6,179,494 B1
DATED : January 30, 2001
INVENTOR(S) : Akira Egawa

It is certified that error appears in the above-identified patent and that said Letters Patent is hereby corrected as shown below:

Sheet 5,
"ACTUATER" (both occurrence) should read -- ACTUATOR --.

Sheet 10,
"ACTUATER" (both occurrence) should read -- ACTUATOR --.

Column 3,
Line 44, "slidden" should read -- slid --.

Column 4,
Line 1, "bar-like" should read -- bar code --.
Line 2, "used one or unused one," should read -- a used one or an unused, --.

Column 7,
Line 11, "inserted" should read -- inserted, --.

Column 8,
Line 27, "he" should read -- the --.

Column 9,
Line 31, "cartridges," should read -- cartridge --.
Line 42, "used" should read -- use --.

Signed and Sealed this

Nineteenth Day of February, 2002

Attest:

JAMES E. ROGAN
*Director of the United States Patent and Trademark Office*

*Attesting Officer*